US005713257A

United States Patent [19]

Fischl

[11] Patent Number: 5,713,257

[45] Date of Patent: Feb. 3, 1998

[54] STACKABLE COMPACT SLITTING KNIFE ASSEMBLY

[76] Inventor: Rudolph Fischl, 17 Henrietta Dr., Fairfield, N.J. 07004

[21] Appl. No.: 36,063

[22] Filed: Mar. 23, 1993

[51] Int. Cl.[6] .............................. B23D 19/00; B26D 1/22

[52] U.S. Cl. .............................. 83/482; 83/505; 83/508.1; 83/508.3

[58] Field of Search .............................. 83/503, 505, 506, 83/507, 508.1, 508.3, 482, 481

[56] References Cited

U.S. PATENT DOCUMENTS

| | | | |
|---|---|---|---|
| 2,802,528 | 8/1957 | Mastriani | 83/505 X |
| 3,777,607 | 12/1973 | Schofield | 83/482 |
| 3,892,156 | 7/1975 | Johnstone | 83/508.1 X |
| 3,921,488 | 11/1975 | Mastriani et al. | 83/505 |
| 3,977,284 | 8/1976 | Mastriani et al. | 83/495 |
| 4,161,898 | 7/1979 | Wingen | 83/508.1 X |
| 4,741,234 | 5/1988 | Colombo | 83/481 |
| 4,876,933 | 10/1989 | Tahara | 83/482 |

*Primary Examiner*—Eugenia Jones
*Attorney, Agent, or Firm*—Louis E. Marn

[57] ABSTRACT

A stackable compact knife cutting assembly employing an elongated pneumatic piston/piston rod assembly wherein the elongated piston member is provided with an elongated preformed elastomeric piston ring member disposed in a groove portion thereof and wherein a cutting assembly includes a housing member and arm portions having a slot for receiving a shaft of the rotating knife member and a bearing surface for guiding and contacting bearing surfaces of the knife member to maintain the perpendicular plane thereof to the rotating axis of the cutting knife member.

9 Claims, 2 Drawing Sheets

STACKABLE COMPACT SLITTING KNIFE ASSEMBLY

BACKGROUND OF THE INVENTION

1. Field of the Invention

The invention relates to a slitting knife assembly, and more particularly to a compact slitting knife assembly readily stackable with a plurality of such assemblies into a slitting or cutting assembly for slitting sheets or webs of flexible materials.

2. Brief Description of the Prior Art

In U.S. Pat. No. 2,802,528 to Mastriani, there is disclosed a slitting knife assembly for slitting webs wherein knife replacement required disassembly of the knife assembly resulting in lost machine time and the like. In U.S. Pat. No. 3,777,607 to Schofield, there is disclosed a knife assembly permitting of facile replacement of the slitting knife; however, providing a knife assembly which might cause non-uniform slitting width due to potential wobbling of the knife within the knife assembly.

In U.S. Pat. No. 4,741,234 to Columbo, there is disclosed a compact knife unit including a guide member having an L-shaped body supporting an elongated fluid activator comprising a piston/piston rod assembly including an upstanding elongated cup-shaped member of an elastomeric material to provide fluid sealing of the piston/piston rod assembly. Dirt particles as well as oily components released in air compressing sequences results in unacceptable failure of the operation of the piston/piston rod assembly thereby rendering ineffective or inoperable the slitting operation. In operations of a cutting assembly using a plurality of such compact knife units ineffectiveness or inoperability of one component requires shutdown and repair or replacement reducing efficiency and increasing unit costs. Additionally, such prior art compact knife units were inadequately supported in the vertical plane thereby having a tendency to bow outwardly exceeding alotted desired widths of product with concomitant waste of material.

OBJECTS OF THE PRESENT INVENTION

It is an object of the present invention to provide an improved stackable compact knife slitting assembly.

Another object of the present invention is to provide an improved stackable compact knife slitting assembly of improved pneumatic capabilities.

Still another object of the present invention is to provide an improved stackable compact knife slitting assembly of improved support characteristics thereby reducing material waste.

Yet another object of the present invention is to provide an improved stackable compact knife slitting assembly of facile replacement of the knife member of the compact knife slitting assembly.

A still further object of the present invention is to provide an improved stackable compact knife slitting assembly substantially eliminating knife wobbling ability.

SUMMARY OF THE INVENTION

These and other objects of the present invention are achieved by a stackable compact knife cutting assembly employing an elongated pneumatic piston/piston rod assembly wherein the elongated piston member is provided with an elongated preformed elastomeric piston ring member disposed in a groove portion thereof and wherein a cutting assembly includes a housing member and arm portions having a slot for receiving a shaft of the rotating knife member and a bearing surface for guiding and contacting bearing surfaces of the knife member to maintain the perpendicular plane thereof to the rotating axis of the cutting knife member.

BRIEF DESCRIPTION OF THE DRAWINGS

Further objects and advantages of the present invention will become apparent from the following detailed description when taken with the accompanying drawings, wherein.

DETAILED DESCRIPTION OF THE INVENTION

Figure 1:
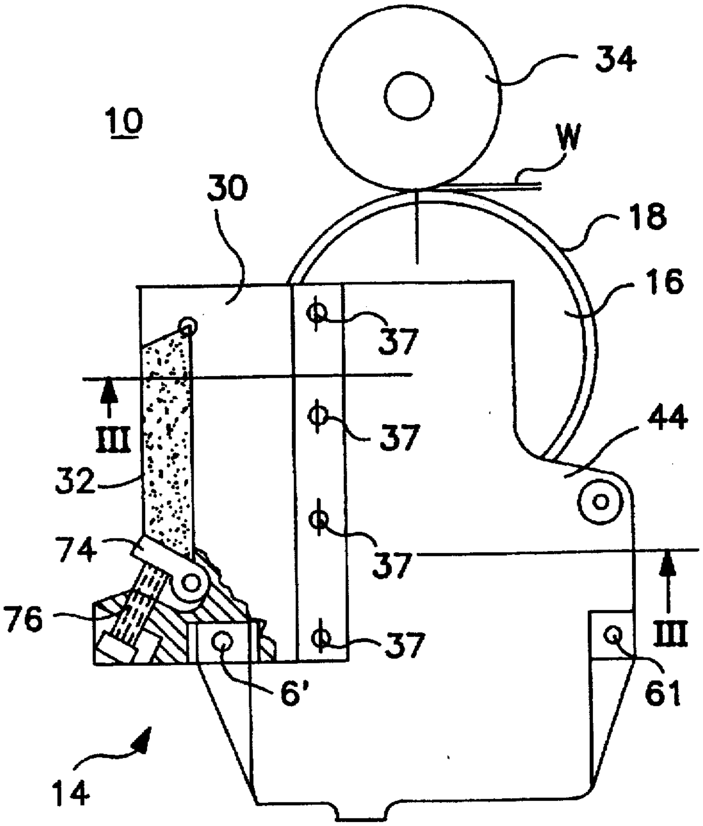
FIG. 1 is an elevational side view, partially in section, of the compact slitting knife assembly of the present invention for slitting a sheet or web of material.
Figure 2:
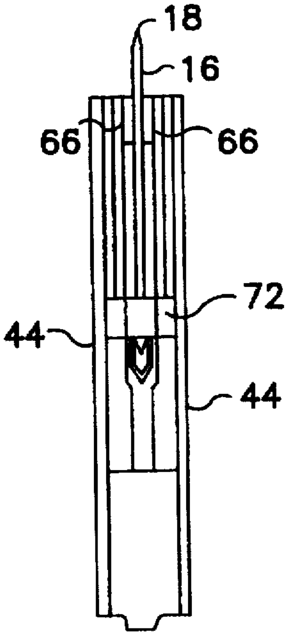
FIG. 2 is a side view of the compact slitting knife assembly of FIG. 1.
Figure 3:
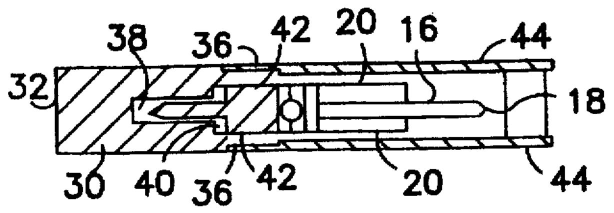
FIG. 3 is a bottom sectional view taken along the line III—III of figures thereof.
Figure 4:
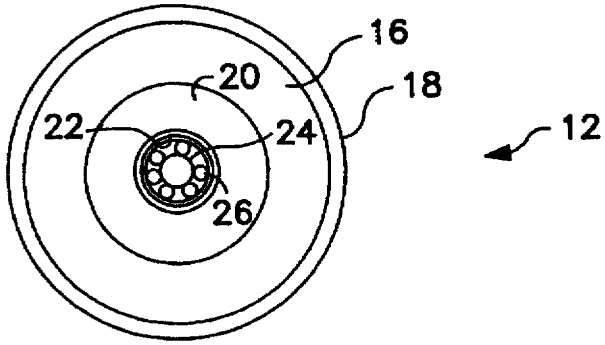
FIG. 4 is an elevational view of the knife blade assembly.

Referring now to the drawings, the compact slitting knife assembly of the present invention, generally indicated as 10, is comprised of a slitting knife blade assembly mounted within a housing assembly, generally indicated as 12 and 14, respectively. The knife blade assembly 12 is comprised of a disc-shaped plate member 16 having a centrally-formed cutting edge 18, disc-shaped finish bearing surfaces 20 and a center bore 22 for positioning a suitable ball bearing member 24 having a centrally-disposed shaft bore 26, referring particularly to FIG. 4. The width of the knife blade assembly 12 at the bearing surface is greater than the width of the plate member 16, the complex slitting knife assembly 10 is generally of a width of about ½ inch permitting side surface to side surface juxtaposition of a plurality of such assemblies in a slitting web assembly.

The housing assembly 14 is comprised of a mounting member 30 for mounting the compact slitting knife assembly 10 onto a swallow tail rail 32 associated with a web or sheet cutting assembly (not shown) housing a plurality of such compact slitting knife assembly 10 for cooperating with an anvil roller 34 for slitting webs or sheets of material (w) of widths of from 4 to 10 feet into strips of widths of at least ½" to 3". Thus, twenty-four (24) of such compact slitting knife assemblies 10 may be positioned per foot on such a swallow tail rail of a web or sheet cutting assembly.

The mounting member 30 is formed of cast iron, and is milled with outer indented side surfaces 36 and a centrally-disposed slot 38 for receiving the cutting edge portion 18 of the plate member 16 and a larger channel 40 having finished bearing surfaces 42 which cooperate with finished surfaces 20 of the plate member 16 as more fully hereinafter discussed. To the outer recessed surfaces 36 of the mounting member 30, there are mounted, such as by bolts 37 side plate members 44 for aiding in attaching an elongated pneumatically activated piston assembly, generally indicated as 46, referring particularly to FIG. 5.

Figure 5:
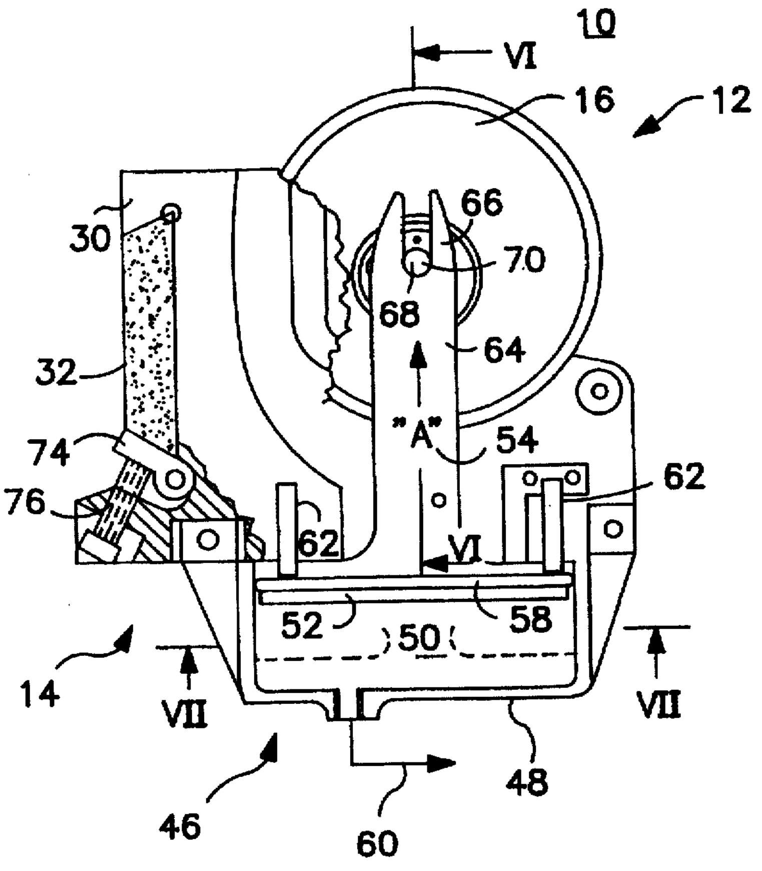
FIG. 5 is a further elevational side view, partially in section of the compact slitting knife assembly of FIG. 1.
Figure 6:
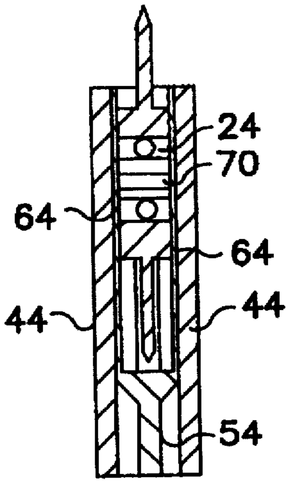
FIG. 6 is a cross-sectional side view taken along the lines VII—VI of FIG. 5.
Figure 7:
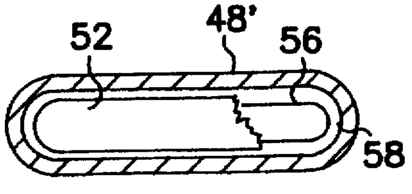
FIG. 7 is a partial cross-sectional view taken along the lines VII—VII of FIG. 5.

The pneumatically activated piston assembly 46, referring to FIGS. 5 and 7, is comprised of an elongated cylinder member 48 defining an elongated chamber 50 for receiving an elongated piston 52 including a shaft portion 54. Generally, the length to width of the elongated chamber is in excess of about 2:1 to 3:1 for knife cutting assemblies of the present invention. The elongated piston 52 is formed with an elongated rectangularly-shaped groove 56 for receiving a preformed elongated (essentially circularly-shaped in cross-section) elastomeric gasket or ring member 58 obviating the problems of the cup-like gasket members of the prior art. The chamber 50 of the cylinder member 48 is in fluid communication by line 80 with a source of pressurized medium as well as related venting valve assembly (not shown).

The pneumatically activated piston assembly 46 is mounted to the side plate members 44 in mounting member 30, such as by bolts 61, and is in spring-loaded relationship thereto by spring member 62 suitably supported in the housing member in a manner to lower the cylinder piston member 52 to a rest position within the chamber 50 of the cylinder member 48, as indicated by the dotted lines in FIG. 5.

The shaft portion 54 of the piston member includes an intermediate portion 64 having upwardly-extending arm portions 66, each including a slot 68 for receiving a shaft 70 positioned within the shaft bore 26 of ball bearing member 24 of the knife blade assembly 12.

A cylindrically-shaped spacer element 72 is mounted to the side plate members 44 to provide appropriate spacing support to maintain parallelism between side plate members 44 to ensure rotational perpendicularity of the knife plate member 16 with respect to the axis thereof and to the sheet or web being processed in the cutting assembly. The housing member 14 is affixed to the swallow tail rail, such as by cooperating clamp pawl 74 and associated screw member 76, such as disclosed in the aforementioned patent to Schofield.

In operation, once positioned on the swallow tail rail 32 of the cutting or slitting assembly, the introduction of a pressurizing fluid, such as pressurized air in line 80 into chamber 50 causes the piston member 52 to be raised (arrow "A") against the tensioning spring pressure of springs 62 to the upper portion of the chamber 56 thereby causing the knife edge 18 to come into contact with the anvil roller 34 under sufficient force to cut, excise or slit any sheet or web of material (w), such as pressure-sensitive tape, roller, etc. passing therebetween. Release of the pressurized medium permits return of the piston member 52 to the rest position under the force of compressed springs 62. Rotation of the plate member 16 is effected by passage of the web of material (w) being passed between the plate member 16 and the anvil roller 34. During rotation of the plate member 16, the bearing surfaces 20 contact respective bearing surfaces 42 of the base member 30 to ensure prependicular rotation of the plate member 16 to its rotational axis. Since the bearing surfaces 42 are displaced from the rotational axis of the plate member 16 as well as the operational or displacement (i.e., raising/lowering) axis of the knife blade assembly 12, wobbling potential of the rotatable knife member 16 is substantially minimized compared to prior art assemblies threby ensuring cutting accuracy.

The use of an elongated pneumatically-operated piston/cylinder assembly having an elongated, O-ring positioned within a groove preformed of the piston member substantially obviates the problems resulting from foreign bodies in the air supply which effected sealing capabilities of the elongated cup-shaped member of the prior art which also lost resiliency and thus developed leakage with concomitant unreliable and malfunctioning piston operation. Additionally, the bearing surfaces of the rotating knife blade member cooperating in contacting relationship with the bearing surfaces of the mounting member minimize wobbling problems associated with the prior art as well as at reduced frictional relationships as a result of the respective finished surfaces and materials of construction.

While the invention has been described in connection with an exemplary embodiment thereof, it will be understood that many modifications will be apparent to those of ordinary skill in the art; and that this application is intended to cover any adaptations or variations thereof. Therefore, it is manifestly intended that this invention be only limited by the claims and the equivalents thereof.

What is claimed is:

1. A compact slitting knife assembly, which comprises:
   - a knife blade assembly including a rotatable blade member having a centrally-formed cutting edge portion and disc-shaped side bearing surfaces;
   - a knife blade housing assembly including a solid base member having means for mounting to a slitting web assembly, a pair of side plate members each mounted to said solid base member and a pneumatically-operated cylinder assembly comprised of a cylinder member having a chamber and a piston member positioned for reciprocating movement within said chamber of said cylinder member, said piston member having arm members for supporting said knife blade assembly, said solid basemember formed with a slot for receiving said cutting edge portion of said blade member and with bearing surfaces for receiving said bearing surfaces of said rotable blade member in rotational contacting relationship, said pneumatically-operated cylinder assembly being mounted to said side plate members and said solid base member.

2. The compact slitting knife assembly as defined in claim 1 wherein a spacer element is mounted to said side plate members and positioned opposite said solid base member.

3. The compact slitting knife assembly as defined in claim 1 wherein said piston member is spring-loaded to a rest position within said chamber of said cylinder member.

4. The compact slitting knife assembly as defined in claim 1 wherein said cylinder member, said chamber of said cylinder member and said piston member are elongated, and said elongated piston member is disposed in said elongated chamber, said elongated piston member being formed with an elongated peripherally-formed groove and wherein an elongated elastomeric ring member is positioned within said elongated peripherally-formed groove.

5. The compact slitting knife assembly as defined in claim 1 wherein said base member is formed with indented surface portions for mounting said side plate members.

6. A compact slitting knife assembly as defined in claim 5 wherein an outer surface portion of each of said side plate members is contiguous with a respective outer surface portion of said base member.

7. The compact slitting knife assembly as defined in claim 1 wherein said solid base member is capable of being mounted to a dove-tail rail of said slitting web assembly.

8. The compact slitting knife assembly as defined in claim 1 wherein said compact slitting knife assembly is of a width of about ½ inch permitting side surface to side surface justaposition of a plurality of such compact slitting knife assemblies.

9. The compact slitting knife assembly as defined in claim 1 wherein said bearing surfaces of said solid basemember are displaced from said cutting edge portion of said rotable blade member.

* * * * *